United States Patent Office 3,461,080
Patented Aug. 12, 1969

3,461,080
METHOD OF MANUFACTURE OF
SULFUR FORMULATIONS
Joe C. Eller and John T. Person, Houston, Tex., assignors, by mesne assignments, to Olin Mathieson Chemical Corporation, New York, N.Y., a corporation of Virginia
No Drawing. Filed May 31, 1966, Ser. No. 553,717
Int. Cl. B01f 3/08
U.S. Cl. 252—363.5                                  4 Claims

ABSTRACT OF THE DISCLOSURE

Finely divided sulphur formulations in solid, readily dispersible form are produced by homogenizing an incipient emulsion of molten sulphur in an aqueous solution of an alkali metal lignosulphonate and drying the emulsion to produce a dry powder.

---

This invention pertains to methods for the formulation of sulphur in water-dispersible form, and the formulations derived therefrom. The formulated product is a dry powder containing sulphur in a very highly dispersed state. The highly dispersed nature of the sulphur makes it especially suitable as a pesticide, as it has been demonstrated that the degree of dispersion of sulphur is related to its efficacy. The formulation contains a lignosulfonate salt as a formulation agent, i.e. as a dispersing agent. In addition to being effective as a pesticide, the sulphur formulations also offer the advantages that are inherent in employing dry powders which, when introduced into water, yield spray solutions that approach a conventional emulsifiable product in their spray properties. The sulphur formulations offer the additional advantage over ordinary emulsifiable products in that they contain no solvent or surfactant which, in previous products, have presented problems from phytotoxic effects.

The principal object of the invention is to provide formulated sulphur products wherein the sulphur is in a very highly dispersed condition.

Another object of the invention is to provide such sulphur products which are readily dispersible in water.

Briefly, the highly dispersed sulphur formulations provided by the invention are prepared by emulsifying elemental sulphur in molten condition in an aqueous solution of a dispersing agent. This technique yields a very high degree of dispersion of the sulphur because the materials in liquid states are readily acted on by shearing forces of homogenizing equipment, such as colloid mills, or the like. Such equipment is much more effective when applied to liquid materials than when applied to solid materials. The dispersed and emulsified sulphur, when prepared in this manner, is very unstable, due to the high surface energy resulting from the very small sulphur particles, unless an appropriate stabilizing agent is added to the system. It has been found that lignosulfonates employed according to this invention create the desired stability in the product. The lignosulfonates not only stabilize the systems against flocculation while still in the aqueous dispersion stage, but also permit drying of the dispersions to dry powders which retain their original colloidal properties resulting from the homogenizing step of the process.

Describing a preferred method embodiment according to the invention, a quantity of elemental sulphur is placed in a vessel to which is also added a water solution of an alkaline metal salt of lignosulfonate, the mixture being agitated to form an incipient emulsion.

The alkaline metal salts of lignosulfonate which may be used include calcium lignosulfonate, sodium lignosulfonate, ammonium lignosulfonate, and potassium lignosulfonate, and the expression "alkaline metal salts of lignosulfonate" is used in the specification and claims hereof to denote these salts. Of these, calcium lignosulfonate is probably most available. Sodium lignosulfonate and potassium lignosulfonate are somewhat more expensive than the other salts. Ammonium lignosulfonate is believed to have better wetting properties than calcium lignosulfonate.

Elemental sulphur (rhombic form) melts at 112.8° C. Impurities in commercial sulphur cause variation in the melting point. Since the melting point of sulphur is above the boiling point of water, and above the boiling points of water-lignosulfonate solutions, the vessel preferably is enclosed and capable of holding a certain amount of pressure.

The mixture (incipient emulsion) of sulphur and water-lignosulfonate solution within the vessel is heated, under pressure, to a temperature resulting in melting of the sulphur. A temperature of 120° C., at a pressure of about 14 p.s.i. above atmospheric pressure has been found to be suitable. The temperature and pressure may be either higher or lower within the range described, the pressure and temperature being related, i.e. the pressure increases as the temperature is increased. The pressure should be such that the mixture is restrained at least from excessive evaporation. The temperature of heating should be low enough that polymerization and other deteriorations thereof of the lignosulfonate will not occur.

After the contents of the vessel have been heated to a temperature such that the sulphur is in molten state, the interior of the vessel being agitated in order to create a crude dispersion of the sulphur in the mixture, the liquid mixture is withdrawn from the vessel and passed, with its temperature maintained, through an apparatus for homogenizing, or breaking down, the sulphur particles to the desired colloidal dispersed condition. This aqueous mixture should be a fairly highly viscous state, in order that the homogenizing equipment, for example a colloid mill, will function near its maximum efficiency in dispersing the sulphur. Relatively thinner mixtures are not so effectively dispersed in most equipment.

The dispersion produced by the homogenizing or milling equipment has a relatively short life, as the sulphur particles tend to crystallize and grow. In such dispersions, the appearance of relatively large crystals usually occurs within a period of from ten to twenty-four hours. While the lignosulfonate present is effective in preventing flocculation of sulphur, it does not effectively inhibit the growth of sulphur crystals.

In heretofore known sulphur preparations prepared in other manners, additives have been employed in efforts to prevent growth of sulphur crystals, but these have proved to be ineffective. According to the present invention, effective prevention of undue growth of sulphur crystals has been achieved by drying of the dispersions within a sufficiently short period of time.

It has been found, in order to accomplish this result, that spray drying is an effective means for the drying of the dispersions. Other drying techniques may possibly be employed. With proper drying of the sulphur dispersions, formulations of sulphur containing particles mostly of one micron size, and smaller, are prepared, which may be stored in the dry state for extended periods of time without change of their properties. The dry products, when introduced into water, yield stable aqueous dispersions of very finely divided dispersed sulphur which are unusually effective as pesticides.

As an example of a preferred embodiment of the method according to the invention, a sulphur formulation was prepared, as follows: 16.0 pounds of technical sulphur and 16.0 pounds of calcium lignosulfonate and 13.0 pounds of water were placed in a vessel which was then sealed. The vessel was equipped with an agitator capable of producing a crude emulsion herein referred to as an incipient emulsion. The contents of the vessel were heated to approximately 120° C. at a pressure of approximately 14 p.s.i.g. The heated crude emulsion was passed through a colloid mill in which the sulphur was reduced to particle sizes mostly below one micron. The material, after passing through the colloid mill, was placed in a vessel having an agitator, and 8.3 pounds of water was added to thin the viscous emulsion resulting from the colloid mill. From this vessel, the aqueous dispersion was pumped to a spray dryer where the dispersed sulphur was dried. The resulting dry powder had excellent storage properties and long shelf life. Upon addition of the dry powder to water, the sulphur promptly redispersed and was found to be eminently suitable for use in commercial spraying equipment. The sprayed material was effectively distributed on foliage, and the like, and was found to have excellent pesticidal properties.

Similar preparations using ammonium, sodium and calcium lignosulfonates were made, their formulations being substantially as above, with equally satisfactory results.

It was also found that the dry powders could be effectively mixed with other dispersed products for spraying.

Mixtures having other proportions of components than the proportions of the above example may be used. It has been found that the lignosulfonate sulphur ratio should not be less than about 40/60 (1/1.5) to produce an acceptable end product. The amount of water in the formula for formation of the incipient emulsion is critical where certain types of homogenizer equipment is to be used in that a certain minimum viscosity of the crude emulsion is required for the colloid mill or other homogenizing device to produce the desired sulphur particle size in the final emulsion. Where a spray dryer is to be used, the viscous emulsion resulting from the colloid mill or other homogenizing device must always be diluted back with water to roughly 60% solid content (maximum) in order to be properly atomized in the spray dryer. When other drying methods are employed, dilution at this stage may not be required, or, sometimes, dilution to further extent may sometimes be required depending on the requirements of the drying equipment and technique.

The products resulting from the invention are ideal from the standpoint of handling and use. Since the material is dry, it may be packaged in bags, or the like, and leak proof containers need not be provided. Accurate weighing for redispersion or spraying purposes is readily accomplished, since concentration factors are not involved and the material may be directly weighed to provide a spraying suspension of proper composition. Screening of the dry powder is not normally required since the spray drying procedure results in a uniform product.

We claim:
1. In a method for the manufacture of stable sulfur formulations wherein an incipient emulsion of molten sulfur in an aqueous solution is agitated and homogenized to form an emulsion of said molten sulfur in said aqueous solution, said emulsion containing at least 60% of solids and drying said emulsion to produce a dry powder, the improvement in which said aqueous solution is an aqueous solution of a metal salt of lignosulfonate selected from the group consisting of calcium lignosulfonate, sodium lignosulfonate, ammonium lignosulfonate, and potassium lignosulfonate, the weight ratio of said salt of lignosulfonate to said sulfur being at least 1:1.5 and the temperature of said emulsion being in excess of 112.8° C. and below the temperature of polymerization of said lignosulfonate.

2. Method according to claim 1, said temperature being about 120° C. at a pressure of about 14 p.s.i.g.

3. Method according to claim 1, said mixture being in the range, sulphur:lignosulfonate:water of about 16:16:13, by weight.

4. Method according to claim 1, said emulsion being diluted with water to a solids content of about 60%, and then said drying of said emulsion being accomplished by spray drying.

References Cited
UNITED STATES PATENTS

| 2,348,736 | 5/1944 | Heath | 167—20 XR |
| 2,658,016 | 11/1953 | Brown et al. | 167—20 |
| 2,858,250 | 10/1958 | Geary | 167—22 XR |
| 2,893,913 | 7/1959 | Wiedow | 167—42 |
| 3,192,193 | 6/1965 | Altscher et al. | 167—42 XR |
| 3,287,209 | 11/1966 | Simmons et al. | 167—42 XR |

FOREIGN PATENTS 200,117  3/1956  Austria.

ALBERT T. MEYERS, Primary Examiner

D. R. MAHANAND, Assistant Examiner

U.S. Cl. X.R.

424—164